United States Patent [19]

Fischer et al.

[11] Patent Number: 5,744,505

[45] Date of Patent: Apr. 28, 1998

[54] PREFOAMED POLYOLEFIN BEADS PRODUCED BY EXTRUSION

[75] Inventors: Joachim Fischer, Grosskarlbach; Franz-Josef Dietzen, Ludwigshafen; Gerd Ehrmann, Deidesheim; Isidoor De Grave, Wachenheim; Jens Rieger, Ludwigshafen, all of Germany

[73] Assignee: BASF Aktiengesellschaft, Ludwigshafen, Germany

[21] Appl. No.: 809,735

[22] PCT Filed: Oct. 6, 1995

[86] PCT No.: PCT/EP95/03946

§ 371 Date: Apr. 10, 1997

§ 102(e) Date: Apr. 10, 1997

[87] PCT Pub. No.: WO96/11971

PCT Pub. Date: Apr. 25, 1996

[30] Foreign Application Priority Data

Oct. 15, 1994 [DE] Germany ............... 44 36 980.8

[51] Int. Cl.$^6$ ............... C08J 9/18; C08J 9/22; C08J 9/36

[52] U.S. Cl. ............... 521/60; 521/56; 521/58; 521/59; 521/79; 521/146

[58] Field of Search ............... 521/56, 59, 60, 521/58, 79, 146

[56] References Cited

FOREIGN PATENT DOCUMENTS 0123144   10/1984   European Pat. Off. .
0144039   6/1985    European Pat. Off. .

Primary Examiner—Morton Foelak
Attorney, Agent, or Firm—Oblon, Spivak, McClelland, Maier & Neustadt, P.C.

[57] ABSTRACT

Prefoamed polyolefin beads, produced by extrusion followed by granulation, have a crystal structure with a double peak.

4 Claims, No Drawings

PREFOAMED POLYOLEFIN BEADS PRODUCED BY EXTRUSION

The invention relates to prefoamed polyolefin beads produced by extrusion followed by granulation.

Prefoamed polyolefin beads, in particular those based on a copolymer of propylene with small amounts of ethylene, are increasingly employed for the production of foam moldings in automotive construction, packaging, and in the leisure sector. The foam beads are usually produced by suspending fine polyolefin granules in water, impregnating them with a volatile blowing agent at superatmospheric pressure and at temperatures near to their softening temperature, releasing the pressure and thus foaming the polyolefin (see EP-A 53333). The polyolefin in the foam beads produced in this way has a specific crystal structure which, in a DSC curve, shows a double peak: a peak typical of the polyolefin and a high-temperature peak.

EP-A 588 321 describes a particularly elegant and simple process for the production of prefoamed polypropylene beads, in which polypropylene is melted in an extruder, and a blowing agent is injected into this melt and homogeneously incorporated at from 125° to 250° C. The homogeneous material is extruded through a round-section die, during which it expands, and is chipped to give foam granules. The polypropylene which is employed should have a melt strength of from 5 to 40 cN and a branched structure. However, it has been found that foam beads produced in this way have a very narrow processing range for production of moldings and do not fuse adequately with one another. For this reason, the moldings have relatively poor mechanical properties. In particular, the elongation at break and the tensile strength are unsatisfactory.

It is an object of the present invention to provide, starting from conventional, ie. not melt-strengthened polyolefin, by extrusion and subsequent granulation, prefoamed polyolefin beads which can be fused without difficulty to give moldings with good mechanical properties.

We have found that this object is achieved if the polyolefin in the foam beads has a crystal structure with a double peak in which the distance between the two peaks is at least 5° C., preferably greater than 8° C.

For the purposes of the present invention, polyolefins are crystalline olefin polymers whose X-ray crystallinity at 25° C. is greater than 25%. Suitable polyolefins for the process are low-, medium- and high-density polyethylenes having a density of from 0.88 to 0.965 g/cm$^3$, polypropylene, and ethylene and propylene copolymers comprising at least 50 mol % of ethylene or propylene units respectively. Suitable comonomers are, for example, $\alpha$-alkenes with up to 12 carbon atoms, such as ethylene, propylene, butene, pentene, hexene or octene, or vinyl esters, such as vinyl acetate, or acrylates, methacrylates, maleates or fumarates of alcohols containing from 1 to 8 carbon atoms, copolymers of ethylene and acrylic acid or its derivatives, and ionomers. Mixtures of different olefin polymers can also be used.

Preference is given to ethylene-propylene copolymers and copolymers of ethylene and/or propylene with a $C_4$- to $C_8$-$\alpha$-olefin.

Particularly preferred propylene copolymers are copolymers of propylene with from 0.5 to 6% by weight of ethylene or from 0.5 to 15% by weight of 1-butene. Particularly preferred ethylene copolymers are copolymers of ethylene with from 1 to 18% by weight of 1-butene, 1-hexene or 1-octene.

Particular preference is also given to copolymers of propylene with from 0.5 to 6% by weight, preferably from 1.5 to 6% by weight, of ethylene and from 0.5 to 6% by weight, preferably from 1.5 to 6% by weight of a $C_4$- to $C_8$-$\alpha$-olefin, such as 1-butene, 1-pentene, 1-hexene, 1-heptene or 1-octene. The copolymers should have a torsion modulus of from 100 to 900, preferably from 150 to 750 N/mm$^2$.

The copolymers are prepared in a known manner by copolymerization of the monomers using transition-metal catalysts. The copolymers are, in general, of linear construction, not crosslinked and not melt-strengthened. The crystalline melting point, determined by DSC, is generally from 95° to 170° C. The enthalpy of fusion, determined by DSC, is generally from 30 to 130 J/g, preferably from 35 to 120 J/g. Preference is given to copolymers with a melt flow index MFI (230; 2.16) (according to DIN 53 735) of from 0.1 to 50, in particular from 0.5 to 20 [g/10 min].

The novel foam beads are preferably produced by saturating polyolefin granules with a blowing agent at a low temperature in an extruder, homogenizing the material and holding it at elevated temperatures, and finally extruding it with accompanying expansion.

A. In a first zone A, the polyolefin granules are saturated with a volatile blowing agent. It is possible to use a fine grit with particle sizes from 0.01 to 10 mm which arises directly from the polymerization, or granules with particle sizes from 0.1 to 10 mm which arise from extrusion of the polyolefin. Suitable blowing agents are organic compounds with boiling points of from 0° to 150° C., for example n-butane, isobutane, n-pentane, isopentane, neopentane, cyclopentane or cyclohexane, heptane, octane, or halogenated hydrocarbons, and mixtures of these. The amount of blowing agent depends on the target bulk density of the foam granules and is preferably from 5 to 40, in particular from 8 to 30 parts by weight, based on 100 parts by weight of polyolefin. Conventional additives, such as dyes, pigments, nucleating agents, stabilizers, flame retardants, lubricants and antistats, can also be added in efficacious amounts at this point.

The saturation of the polyolefin granules with the blowing agent is preferably carried out in the feed zone of an extruder, where the shear forces are low. It is important that the initial swelling takes place at a relatively low temperature, ie. the temperature must be from 50° to 180° C., preferably from 100° to 150° C., below the crystalline melting point of the polyolefin and at least 10° C. below the boiling point of the blowing agent, so that this does not evaporate. By operating under a pressure of up to 10 bar above atmospheric pressure, low-boiling blowing agents, such as butanes, can even be metered in at room temperature. In this case, the polyolefin granules are, for example, fed into zone A via a rotary valve. In the case of the preferred polypropylene copolymers with crystalline melting points of from 100° to 165° C., the temperature in zone A is preferably from 10° to 40° C., in particular room temperature. The residence time in this zone is preferably from 0.1 to 5 min. The polyolefin is saturated with the blowing agent to the extent that its viscosity is sharply reduced.

B. This reduction in viscosity allows the homogenization in zone B to be carried out at from 2° to 50° C., preferably from 5° to 40° C., below the crystalline melting point of the pure polyolefin. This is a further advantage in comparison with the process of EP-A 588 321, where extrusion is carried out at significantly higher temperatures. This homogenization with simultaneous temperature increase is preferably carried out in a second zone (homogenizing zone) of the extruder already used in step A. Carbon dioxide or nitrogen can be metered into zone B in small quantities (eg. from 0.1 to 5% by weight) for regulation of the cell diameter.

C. Finally, the material is held for some time, preferably from 1 to 60 min. at from 2° to 50° C. below the crystalline melting point of the polyolefin. This is expediently carried out in a holding zone C, arranged downstream of zone B, for example in a static mixer (Sulzer mixer) or in a low-shear extruder (single-screw extruder). For improved material transfer between zones B and C, particularly if a static mixer is used, it may be advantageous to provide a gear pump at the transition between these zones.

D. Finally, the material is extruded, expediently through at least one round-section die, into the open atmosphere. The polyolefin, which expands under the sudden pressure reduction, is immediately granulated; granulation is expediently carried out by die-face cutting.

The resultant foam beads are ellipsoidal to spherical. The mean diameter is from 2 to 20 mm. Their bulk density can be adjusted within wide limits of from 0.01 to 0.2 $g/cm^{-1}$, preferably from 0.01 to 0.15 $g/cm^{-1}$. The cell count is generally from 0.1 to 1000 cells per $mm^2$.

Moldings with good mechanical properties can be produced by fusion of the novel prefoamed beads in a conventional manner.

EXAMPLE 15 kg/h of a particulate copolymer of propylene with 2.5% by weight of ethylene (crystalline melting point 147.5° C.) and 0.15 kg/h of talc were fed continuously into the feed zone A of a twin-screw extruder (D=60 mm, L=36 D). The blowing agent (3 kg/h of cyclopentane) was injected between the feed zone and the transition point into the homogenizing zone. The temperature at this point was 25° C., and the pressure was atmospheric pressure. There then followed the transition into the homogenizing zone B, where the extruder was heated to a barrel temperature of 100° C. This heating, together with frictional heat, increased the material temperature to 125° C., whereupon the material immediately melted. Following this, a pressure of about 170 bar was developed by a gear pump which was maintained at 130° C. The gear pump was followed by a holding zone C, consisting of 4 Sulzer mixers (DN=80 mm). These were maintained at 130° C. After a holding time of 45 min, the polymer containing blowing agent was extruded through a 2 mm diameter round-section die and granulated using a Berstorff granulator. The foam beads obtained had a diameter of 10 mm. Their bulk density was 0.22 g/l. The DSC curve shows two maxima at 146° C. and 160° C.

We claim:

1. A process for producing prefoamed polyolefin beads having a crystal structure which in a DSC curve (obtained by heating from 3 to 6 mg of the foam beads to 220° C. at a heating rate of 20° C./min in a differential calorimeter), show a peak typical of the polyolefin and a high-temperature peak where the distance between the two peaks is at least 5° C., which comprises:

A. saturating granules of a crystalline polyolefin with a physical blowing agent at a temperature which is from 50° to 180° C. below the crystalline melting point of the polyolefin and at least 10° C. below the boiling point of the blowing agent, in a feed zone of an extruder, B. homogenizing the polyolefin containing blowing agent at increasing temperature in a homogenizing zone of the extruder, where the material temperature is from 2° to 50° C. below the crystalline melting point of the pure polyolefin, C. holding the melt at this temperature for from 1 to 60 min at this temperature in a holding zone, and D. extruding the polyolefin containing blowing agent into the open atmosphere, with accompanying expansion, and finally granulating the material.

2. The process as claimed in claim 1, wherein the polyolefin is a random copolymer of propylene with from 0.5 to 6% by weight of ethylene or from 0.5 to 15% by weight of 1-butene.

3. The process as claimed in claim 1, wherein the prefoamed polyolefin beads have a bulk density of from 0.01 to 0.2 g/cm.

4. The process as claimed in claim 1, wherein the prefoamed polyolefin beads have a diameter of from 2 to 20 mm.

* * * * *